July 23, 1963 J. R. HERR 3,098,953
TIME DELAY CIRCUIT
Filed Aug. 1, 1960
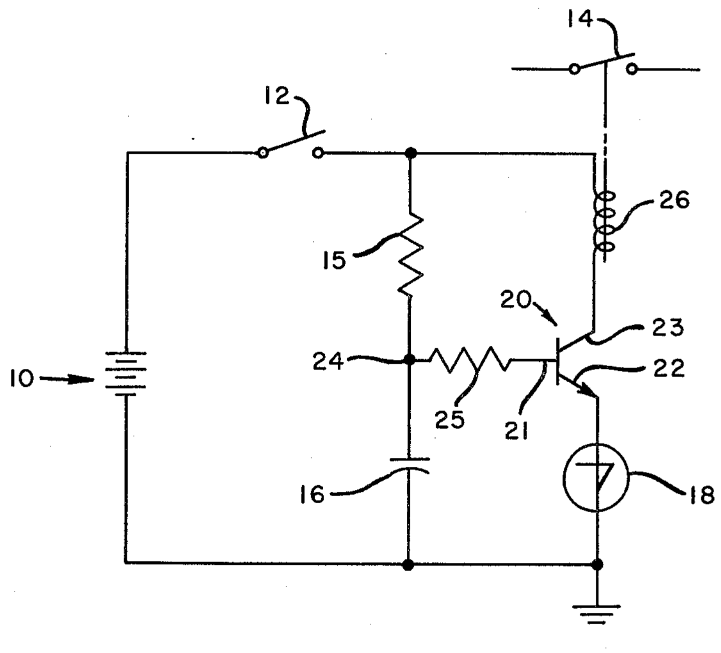
INVENTOR.
JOSEPH R. HERR
BY [signature]
ATTORNEY 3,098,953
Patented July 23, 1963

3,098,953

TIME DELAY CIRCUIT

Joseph R. Herr, Palo Alto, Calif., assignor to Sylvania Electric Products Inc., a corporation of Delaware Filed Aug. 1, 1960, Ser. No. 46,566
2 Claims. (Cl. 317—148.5)

This invention relates to time delay circuits, and in particular to such circuits that are capable of producing long delays, in the order of thirty seconds or more.

The combination of resistance and capacitance is widely used in time delay circuits, the rate or time of charging of the capacitor through the resistance being a function of the product of the resistance and capacitance, called the RC constant. The RC or time constant of this circuit is varied by changing the value of the resistance or the capacitance, or both. When an RC circuit of this type is connected to a relay energizing coil, for example, in a manner to provide a time delay in conjunction with energization of the coil, a limitation is imposed on the size of the resistance by the voltage of the power supply and by the holding current characteristics of the relay, i.e., the current required to hold the relay closed dictates the maximum allowable size of the resistor. In this case, only the capacitor remains as a variable circuit parameter with which to change the time delay, and for delays in the order of thirty seconds or more the size of the charging capacitor becomes unduly large.

An object of this invention is the provision of a time delay circuit in which delays in the order of thirty seconds or more are achievable with relatively small charging capacitors.

Another object is the provision of an RC time delay circuit having a long time delay characteristic and yet which does not require a correspondingly large power supply.

A more specific object is the provision of a time delay relay capable of exhibiting delays in the order of thirty seconds or more with minimum power supply and capacitance requirements.

Still another object is the provision of a time delay circuit that is compact, light in weight and relatively simple in design.

These and other objects of my invention will become apparent from the following description of the preferred embodiment thereof, reference being had to the accompanying circuit diagram of the time delay circuit embodying the invention.

The time delay relay, according to this invention, derives its power from a suitable power source, such as a battery 10, connected to the circuit by a switch 12. Another switch 14 connected in the circuit to be controlled is activated by the circuit containing switch 12 so that switch 14 closes after a predetermined interval following the closing of switch 12.

The time delay circuit embodying my invention comprises a resistor 15 and a capacitor 16 connected in series across power supply 10. The voltage developed across capacitor 16 as a result of charging current through resistor 15 is applied to a diode 18 through a junction semiconductor or transistor 20 having a base electrode 21, an emitter electrode 22 and a collector electrode 23. Diode 18 preferably is a solid state device known in the art as a four-layer transistor diode, or a trans-switch or a diffused silicon PNPN controlled rectifier, and comprises a three-junction semiconductor which conducts current when the potential applied across it reaches a threshold value. The characteristics of diode 18 are such that upon firing the voltage across the diode drops from a relatively high to a relatively low value. For example, the voltage required to fire one diode is 16 volts and the voltage drop across the diode while it is conducting is 1 volt, a ratio of 16 to 1. The base electrode 21 is connected to a point 24 between resistor 15 and one side of capacitor 16 by resistor 25, collector electrode 23 is connected to relay coil 26 and emitter electrode 22 is connected to diode 18. Transistor 20 may be either the NPN or PNP type. The transistor shown in the sketch by way of example is the NPN type.

As mentioned above, the purpose of a time delay network is to introduce a delay of predetermined length from the closing of switch 12 to the closing of switch 14. When switch 12 is closed, point 24 is approximately at zero potential. Current from source 10 flows through switch 12 and charges capacitor 16 through resistor 15, and the potential at point 24 increases exponentially. This increasing voltage is applied through the base-emitter junction of transistor 20, which has a characteristic low voltage drop under forward bias condition, to the four-layer diode 18 which remains nonconducting until the impressed voltage reaches the predetermined or firing value. When diode 18 fires, that is, when diode 18 conducts, current flows through resistor 15, base electrode 21, emitter electrode 22 and through diode 18. Simultaneously current flows through relay coil 26, collector electrode 23, emitter electrode 22 and diode 18, and relay switch 14 closes. As long as the flow of current through diode 18 does not fall below a predetermined minimum established by the characteristics of the diode, the latter remains conducting and provides a path for current through relay coil 26 and the emitter to collector electrodes of transistor 20. Resistor 25 serves to protect the base-emitter junction of the transistor at the time diode 18 fires.

The magnitude of current through diode 18 in its conducting state is directly dependent upon current passing successively through resistor 15, resistor 25, base electrode 21 and emitter electrode 22 and upon the base-emitter current gain of transistor 20. As a result of this gain, the ohmic value of resistor 15 may be greatly increased without unduly reducing the current through diode 18, e.g., without limiting the current through the diode below a value required (by diode characteristics) to maintin the diode in a conducting state. Stated differently, the current gain through transistor 20 overcomes the current limiting effect of resistor 15 which therefore may have a greater ohmic value than without the transistor. The increase in size of resistor 15 permits a reduction in the size of capacitor 16 without a corresponding reduction in the time constant of these components, and thus a saving in the bulk and cost of the large capacitor 16 is realized.

By way of example and comparison, component values and characteristics of a time delay circuit with and without the use of a transistor 20 are listed below:

| | 30-second delay | |
|---|---|---|
| | Without transistor | With transistor |
| Relay Holding Current (Milliamperes) | 2 | 2 |
| Diode Firing Voltage (Volts) | 20 | 20 |
| Diode Holding Current (Milliamperes) | 2 | 2 |
| Supply Voltage (Volts) | 30 | 30 |
| Resistor 15 (Ohms) | 10K | 500K |
| Capacitor 16 (Microfarads) | 2,780 | 55 |

Changes, modifications and improvements to the above described embodiment of my invention may be made by those skilled in the art without departing from the spirit and scope of the invention. The appended claims define the scope of the invention.

I claim:

1. A time delay circuit comprising a semiconductor device having an emitter, a collector and a base electrode, a semiconductor diode connected to said emitter electrode and operative to change from a non-conducting state to a conducting state when a firing voltage is impressed thereon, said diode in the conducting state being characterized by a voltage drop thereacross that is substantially less than said firing voltage, relay means having a current coil connected to said collector electrode, a charging capacitor and a charging resistor connected in series, means for connecting the resistor side of said capacitor to said base electrode whereby the voltage developed across said capacitor is impressed on said diode through said semiconductor device, a power supply, and switch means for connecting said power supply across said resistor and said capacitor and across said coil and said diode, the closing of said switch means causing said capacitor to charge and the voltage thereacross to increase slowly with time until it equals the firing voltage of said diode whereupon current flows through said relay coil to operate the relay means.

2. A time delay circuit comprising a semiconductor device having an emitter, a collector and a base electrode, an electronic switch connected to said emitter electrode and operative to change from a non-conducting state to a conducting state when a predetermined voltage is impressed thereon, said switch in the conducting state being characterized by a voltage drop thereacross that is substantially less than said predetermined voltage, relay means having a current coil connected to said collector electrode, a charging capacitor and a charging resistor connected in series, means for connecting the resistor side of said capacitor to said base electrode whereby the voltage developed across said capacitor is impressed on said switch through said semiconductor device, a power supply, and switch means for connecting said power supply across said resistor and said capacitor and across said coil and said electronic switch, the closing of said switch means causing said capacitor to charge and the voltage thereacross to increase slowly with time until it equals the firing voltage of said electronic switch whereupon current flows through said relay coil to operate the relay.

References Cited in the file of this patent

UNITED STATES PATENTS

| | | |
|---|---|---|
| 2,960,926 | Bauer | Sept. 29, 1959 |
| 2,947,916 | Beck | Aug. 2, 1960 |
| 2,984,779 | Klees | May 16, 1961 |